Feb. 9, 1960
C. G. KANZELBERGER ET AL
2,924,299
BRAKE MECHANISM FOR DRAFTING TABLE
Filed Oct. 22, 1957
2 Sheets-Sheet 1
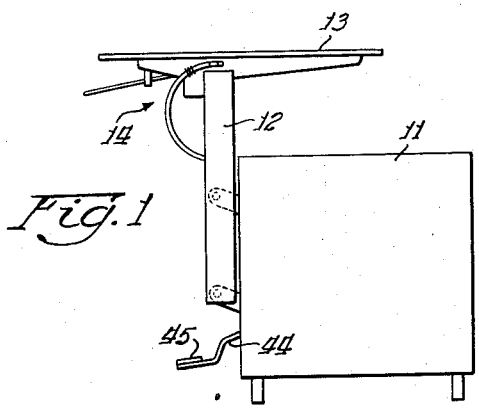
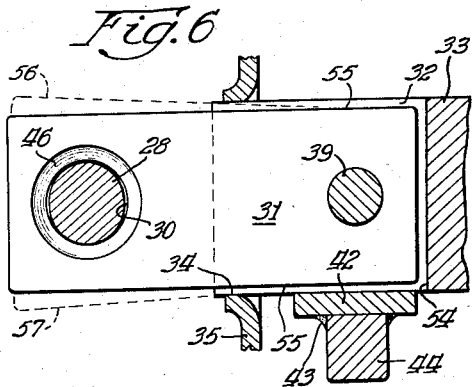
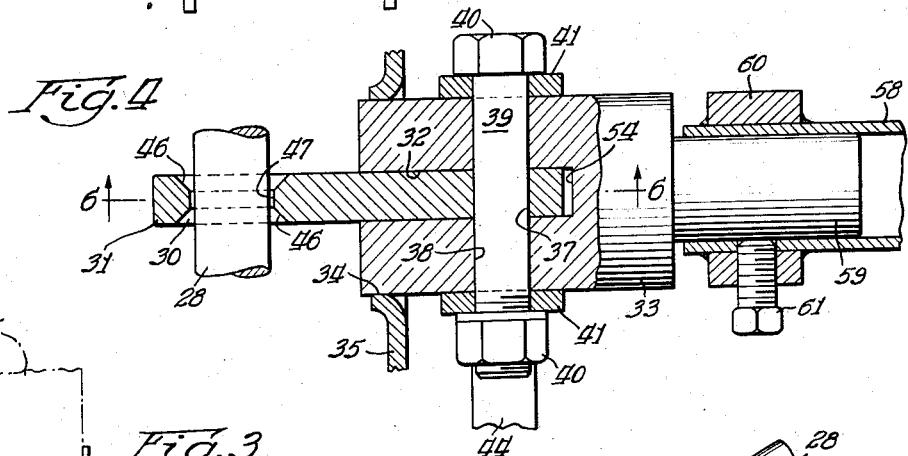
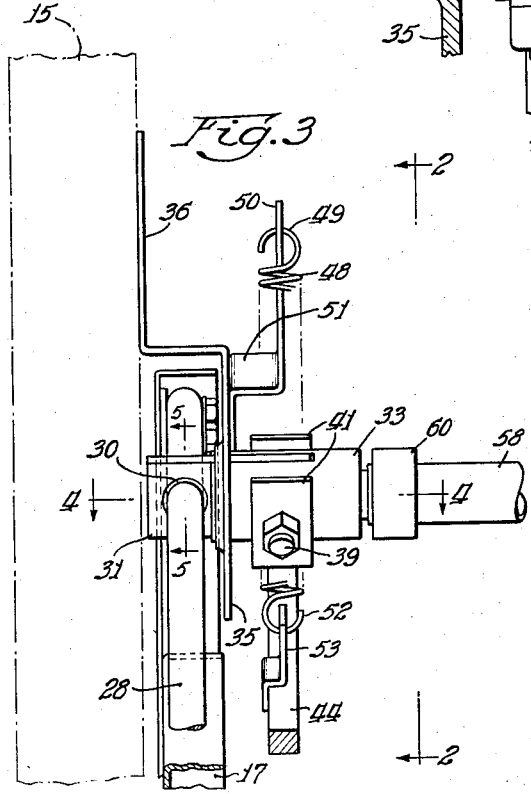
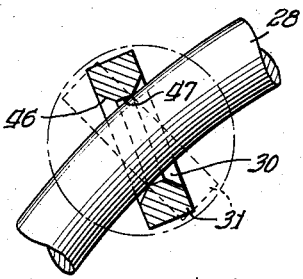
Inventors:
Claude G. Kanzelberger
and Victor H. Hiers
By: Jones, Darbo + Robertson
Attys.

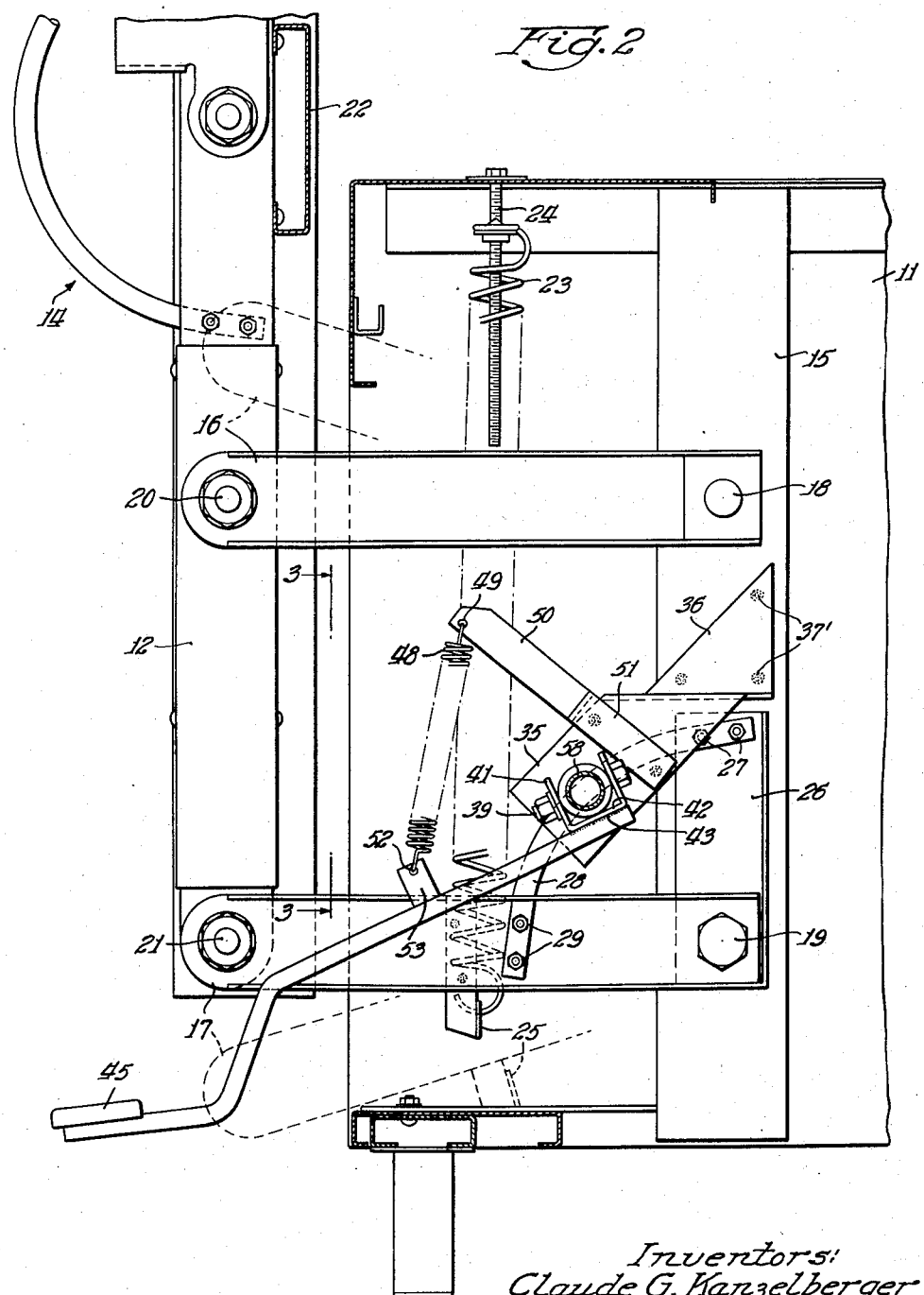

United States Patent Office 2,924,299
Patented Feb. 9, 1960

2,924,299

BRAKE MECHANISM FOR DRAFTING TABLE

Claude G. Kanzelberger and Victor H. Hiers, Two Rivers, Wis., assignors to Hamilton Manufacturing Company, Two Rivers, Wis., a corporation of Wisconsin Application October 22, 1957, Serial No. 691,611

3 Claims. (Cl. 188—67)

This invention relates to brake mechanism for drafting tables and is particularly adaptable for such tables providing adjustment of the drafting board, as shown, for example, in patent to Froelich No. 2,356,924, granted August 29, 1944, for "Adjustable Stand for Draftsmen or the Like" and is an improvement on the brake mechanism shown in that patent.

In said Froelich patent there is disclosed relatively movable members comprising an arcuate bar carried by one member, a rockable element mounted on the other member, a torsion spring carried by the rockable element encircling the bar in wrapped around normally gripping relation thereto, and means for resiliently rocking the rockable member to release the torsion spring for relative movement of the relatively movable members.

The present invention substitutes for the torsion spring of the said patent a friction grip member apertured to pass the arcuate bar therethrough and pivoted on the rockable element for limited swinging movement in a plane extending axially of the rockable member to permit the friction grip member to accommodate variations in the path of travel of the bar, thus guarding against jamming or other breakdown of the mechanism, and assuring ease and facility of relative movement of the parts in all positions of angular adjustment so as to conserve the time of the draftsman and expedite his work while minimizing the manual effort involved in operating the mechanism.

In a further aspect, the invention provides means for articulating the friction grip member with the rockable member to provide for such limited swinging movement therebetween while insuring a positive limitation thereof to guard against excessive misalignment that would defeat the purpose of the limited play permitted.

The foregoing and other objects and advantages will be apparent from the following description, taken together with the accompanying drawings, showing an illustrative embodiment of the invention, and in which drawings—

Figure 1 is a reduced side view of a drafting table to which the present invention in adaptable;

Figure 2 is an enlarged vertical sectional view of the table of Fig. 1 being a view taken on 2—2 of Fig. 3, showing expedients of the present invention associated therewith, selective adjustments of the drawing board being indicated in full and in dotted lines respectively;

Figure 3 is a view of parts incorporating the present invention taken on the line 3—3 of Fig. 2;

Figure 4 is a further enlarged cross section taken on the line 4—4 of Fig. 3;

Figure 5 is a fragmentary schematic view taken on the line 5—5 of Fig. 3; and

Figure 6 is an axial section on the line 6—6 of Fig. 4.

The drafting table here shown to illustrate the present invention has a desk or table base 11 on which are adjustably mounted a pair of vertical struts 12, one at each end of the table for carrying the drafting board 13 that is again adjustably mounted on the struts 12 as by expedients indicated generally by the numeral 14 and which may conform to the teaching of the said Froelich patent. Each of the struts 12, as seen in Fig. 2, looking at the left-hand strut, is articulated with an upright 15, rigidly mounted within the table, through the intermediation of a pair of links 16 and 17 that are pivotally connected as at 18 and 19 respectively with the upright 15 and as at 20 and 21 respectively with the strut. The two struts 12 are made mutually rigid by a cross piece 22. An upper adjusted position for the strut 12 is suggested (Fig. 2) by the dotted line position of link 16, and a lower adjusted position by the dotted line position of link 17. The upright 15, strut 12 and links 16 and 17 thus form a parallelogram that maintains the strut 12 vertical in any elevated or lowered position of the strut with respect to the table 11 to adjust the height of the drawing board 13, the weight of the struts and board being counterbalanced by relatively heavy expansion coil spring 23 that hangs from a bolt 24 at the top of the table and is hooked at its lower end to a lug 25 rigid with the lower link 17. The latter has a right angular extension 26 rigid therewith to which is secured as at 27 the upper end of an arcuate bar 28 the other end of which is secured as at 29 to the main part of the link 17 so that the bar 28 forms a quadrant about the pivot point 19 of the link 17.

Turning now to the expendients of the present invention, and referring in detail to the illustrative construction shown in the drawings, the bar 28 passes slidingly through an aperture 30 in a friction grip member 31 here shown in the form of a rectangular plate that is received in a corresponding slot 32 in a rockable element such as the trunnion 33, the trunnion being cylindrical and being journaled for easy rotation in the circular opening 34 in the offset portion 35 of the bracket 36, which thus serves as a bearing for the trunnion, and that is secured as by spot welding 37' to the table upright 15, the offset portion 35 of the bracket being spaced from the upright on the opposite side therefrom from the arcuate bar 28 and so as to locate the end of the friction member 31 through which the arcuate bar passes on the opposite side of the bracket offset 35 from the place where the friction member 31 is articulated with the trunnion 33, as best seen in Figs. 3 and 4.

Articulation of the friction member 31 with the trunnion is provided by a pair of registering holes 37 and 38 in the friction member 31 and trunnion 33 respectively that intersect the slot 32 in the trunnion and through which is passed a pivot bolt 39. The pivot bolt 39 also clamps to the trunnion 33 as by nuts 40 the legs 41 of a U-shaped clevis, the bight 42 of which is welded as at 43 to a lever 44 that extends outwardly of the table and terminates in a pedal 45.

It will be seen that the gripping member 31 lies with the trunnion 33 in the journal opening 34.

Aperture 30 in friction member 31, that passes the arcuate bar 28 therethrough, is advantageously circular to correspond to the circular cross-section shown for the bar 28 and has chamfered margins 46 that effect a reduced edge 47 for the aperture that in one position of the member 31 frictionally grips the bar 28 as shown in full lines in Fig. 5 to prevent relative movement of bar 28 and member 31, while in the alternative rotative position of the member 31, as shown in dotted lines in Fig. 5, permits the bar 28 to slide through the opening 30, such sliding movements permitting elevation of the struts 12 or depression thereof with respect to the table.

To urge rotation of the trunnion 33 and with it the gripping member 31 in a direction to have the latter grip the bar, another expansion coil spring 48 is shown hooked at one end as at 49 to arm or sub-bracket 50 fixed as by an offset 51 to the bracket extension 35 and hooked at its other end as at 52 to a lug 53 that is rigid with the lever 44, the offset 50 thus locating the spring 48 in the vertical plane of movement of the lever 44. When the pedal 45 is depressed by the foot of the draftsman, the spring 48 is expanded and the gripping member 31 is rotated to the dotted line position shown in Fig. 5, permitting relative sliding movement of the member and bar, during which time the draftsman may manually adjust the elevation of the struts 12. As soon as he releases the pedal, the spring 48 returns the gripping member 31 to gripping position to prevent movement up or down of the struts 12.

Further in accordance with the present invention, the gripping member 31 is located in the slot 32 slightly short of the inner end 54 of the slot, and the width of the member 31 transversely to the pivot pin 39 is slightly less than the slot as indicated by the edges 55 of the member 31. Thus the latter has play in the slot 32 in a plane normal to the pivot pin 39 within the limits of the journal opening 34 in the bracket extension 35 as indicated by the broken lines 56 and 57 (Fig. 6). This play permits desirable slight axial misalignment of the member 31 and trunnion 33 that in turn permits the member 31 to adjust itself to accommodate slight variations in the path of travel of the bar 28 as may occur when the struts 12 are moved manually up or down by the draftsman, thus guarding against jamming or breakdown of the mechanism.

Such play as is permitted the friction grip member 31 is desirably limited by the journal opening 34 since the gripping member lies within the opening as does the trunnion 33 and circumscribed thereby in a radial plane therearound.

The description of one of the brake mechanisms for the arcuate bar 28 at the left-hand side of the table 11 will be understood to apply complementarily to similar brake mechanism associated with another arcuate bar 28 at the right-hand side of the table, not here shown, a description of one being sufficient for both. It may be noted that only a single pedal 45 is required, the effect of the lever 44 being transmitted to both brake mechanisms by a hollow rock shaft 58 that extends across the table between the brake mechanisms and is connected to both by receiving in its ends respectively the reduced shank 59 of trunnion 33. A collar 60 and set screw 61 locks the trunnion shank 59 to the rock shaft 58.

The invention having been described, such changes may be made as fall within the scope of the appended claims without departing therefrom.

What is here claimed is:

1. In brake mechanism for a drafting table embodying, an arcuate bar and a friction grip member having an aperture for passage of the bar therethrough, a spring urging the member in one rotative direction to cause the member to grip the bar, and a lever for rotating the member in the opposite direction against the force of said spring to permit the bar to be slidable with respect to the member, that improvement, comprising, a trunnion, an axially and radially extending slot in the trunnion receiving the member, registering transverse holes in the trunnion and the member interseting said slot, a pintle passing through said holes in the trunnion and member whereby the member may have swinging movement out of axial alignment with the trunnion to accommodate variations in the path of travel of the bar, and a bearing carried by the table for rotation of the trunnion therein.

2. The structure of claim 1 wherein the member is flat in a plane extending axially of the trunnion and wherein the inner end of the member is spaced from the end of the slot to provide clearance for said swinging movements.

3. The structure of claim 1 wherein the member is flat in a plane extending axially of the trunnion and is slightly narrower than the diameter of the trunnion to provide limited clearance in the bearing, the bearing encircling both the trunnion and said member.

References Cited in the file of this patent
UNITED STATES PATENTS

| | | |
|---|---|---|
| 836,303 | Christensen | Nov. 20, 1906 |
| 1,606,840 | Keonigkramer | Nov. 16, 1926 |
| 2,233,329 | Sprink | Feb. 25, 1941 |
| 2,356,924 | Froelich | Aug. 29, 1944 |
| 2,588,174 | Spielburg | Mar. 4, 1952 |
| 2,605,156 | Laxo | July 29, 1952 |
| 2,795,299 | Batori | June 11, 1957 |
| 2,871,713 | House | Feb. 3, 1959 |